United States Patent [19]
Albrecht et al.

[11] Patent Number: 5,768,060
[45] Date of Patent: Jun. 16, 1998

[54] LOW POFILE RADIALLY AND AXIALLY PRELOADED BALL BEARING FOR ACTUATOR PIVOT

[75] Inventors: David William Albrecht, San Jose; David Harwood McMurtry, San Juan Bautista; Darrell Dean Palmer, San Jose; Kirk Barrows Price, San Jose; Oscar Jaime Ruiz, San Jose, all of Calif.

[73] Assignee: International Business Machines Corporation, Armonk, N.Y.

[21] Appl. No.: 725,284

[22] Filed: Oct. 2, 1996

[51] Int. Cl.$^6$ .................................................. G11B 25/04
[52] U.S. Cl. ....................... 360/106; 360/99.08; 384/516
[58] Field of Search ............................. 360/106, 99.08, 360/99.12; 384/499, 502, 507, 513, 516

[56] References Cited

U.S. PATENT DOCUMENTS

| 937,822 | 10/1909 | Jenkins | 384/502 |
|---|---|---|---|
| 4,568,992 | 2/1986 | Kaczeus et al. | 360/105 |
| 4,682,255 | 7/1987 | Sleger et al. | 360/106 |
| 4,718,781 | 1/1988 | Gerard | 384/516 |
| 4,896,239 | 1/1990 | Ghose | 360/106 |
| 5,427,458 | 6/1995 | Sanchez | 384/516 |
| 5,555,233 | 9/1996 | Yano et al. | 360/99.12 X |

FOREIGN PATENT DOCUMENTS

| 62-159380 | 1/1986 | Japan | G11B 21/02 |
|---|---|---|---|
| 3-69071 | 8/1989 | Japan | G11B 21/02 |
| 1831599 | 7/1993 | U.S.S.R. | 384/513 |
| WO93/05504 | 3/1993 | WIPO | G11B 5/012 |
| WO94/09487 | 4/1994 | WIPO | G11B 5/012 |

*Primary Examiner*—John H. Wolff
*Attorney, Agent, or Firm*—Baker Maxham Jester & Meador

[57] ABSTRACT

A radially and axially preloaded bearing that has a very low mass and axial profile and which can be used in a actuator pivot of a direct access storage device without the need for a second bearing to counter the preload. An outer race of the bearing is split in order to form an open ring. Three balls are placed between the outer race and an inner race. Both the inner surface of the outer race and the outer surface of the inner race are formed such that two contact points exist between each ball and each race. Alternatively, the outer race is a closed toroid. The inner race is radially split to form a lower and an upper race, each being a closed toroid. In yet another alternative, the outer race is radially split into an upper outer race and a lower outer race. The inner race is a single closed toroid. A limiter is used to limit the movement of each of the balls. Alternatively, a conventional ball cage is used.

26 Claims, 7 Drawing Sheets

LOW POFILE RADIALLY AND AXIALLY PRELOADED BALL BEARING FOR ACTUATOR PIVOT

BACKGROUND OF THE INVENTION

1. Field of the Invention

The present invention relates generally to ball bearings, and more particularly to ball bearings used in direct access storage devices to allow pivotal motion of a rotary actuator.

2. Description of the Related Art

Rotary actuators position read/write heads over a track on a medium on which information is stored in a direct access storage device, such as a magnetic disk drive. As the demand for greater information storage capacity increases, so does the need to place tracks of information stored on a medium closer together.

Additionally, some applications for magnetic disk drives, for example, portable computers, require a very low vertical height. In such drives, the need for an actuator pivot with a low axial profile will be clear to those skilled in the art.

One limitation on the minimum distances between tracks is the overall mass of the bearings required in the rotary actuator which positions the head. By reducing the overall mass of the bearings, the inertia of the actuator which carries the read/write head is reduced, thus making it possible to more rapidly and more accurately position the read/write head. It will be clear to those skilled in the art that by reducing the mass of the bearings used within the rotary actuator, the speed and accuracy with which the read/write head can be repositioned increases. Accordingly, when the need for greater information storage capacity increases, so does the need to reduce the overall mass of the bearings required in the rotary actuators. Bearing height needs to be reduced also. In small disk files, the overall height is constrained to less than 1 mm, which is the space taken by the balls alone. Thus, a design that contains the bearing within a distance comparable to the balls diameter is needed.

Figure 1A:
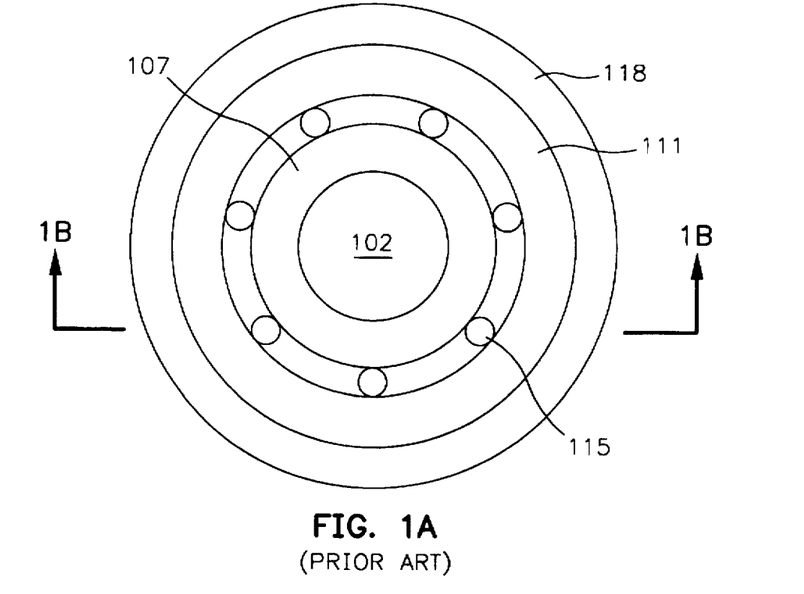
FIG. 1a is an illustration of a prior art pivot.
Figure 1B:
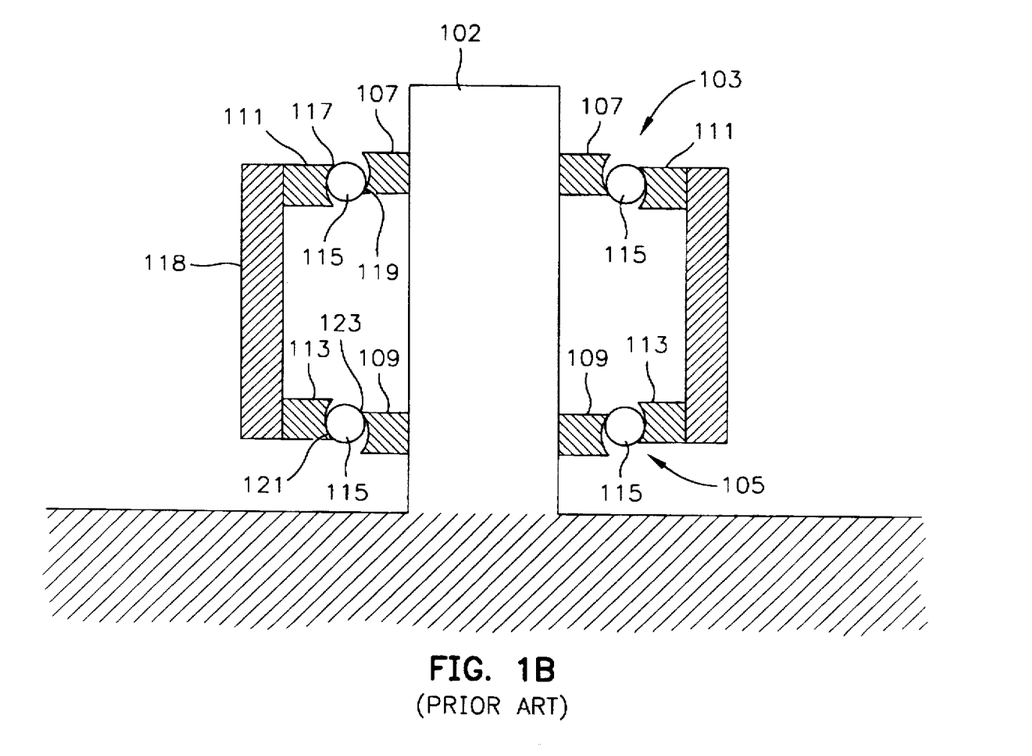
FIG. 1b is a cross-sectional view of the prior art pivot of FIG. 1, taken along the line A—A.

FIG. 1a is an illustration of a prior art pivot 101. FIG. 1b is a cross-sectional view of the prior art pivot of FIG. 1, taken along the line A—A. Currently, prior art actuators are typically constructed as shown in FIGS. 1a and 1b, with a pivot having a central shaft 102 upon which two angular contact ball bearings 103, 105 are axially preloaded against each other. Each ball bearing 103, 105 includes an inner race 107, 109, an outer race 111, 113, a plurality of balls 115, and an outer shell 118. The pair of bearings 103, 105 are preloaded against each other by first fixing three of the four races (inner race 107, 109 and outer race 111, 113) to either the shaft 102 or the outer shell 118. The remaining fourth race is then axially loaded with a specified preload and fixed in place by some means, such as adhesive bonding. In FIG. 1B, the last race to be preloaded and bonded is either 111 or 115, creating what is termed an "X" pre-loaded arrangement. Alternatively, the outer races 111, 115 and one inner race 109 could be first fixed in place by such means as adhesive bonding. The remaining inner race 107 would then be preloaded and fixed in place to create what is termed a "diamond" preload arrangement. In still another typical pivot prior art, the two inner races 107, 109 and shaft 102 are combined in a common member. One of the outer races 121 is first fixed to the outer shell 118 of the pivot, and the other outer race 111 is preloaded and fixed in place as previously described. The bearings are preloaded to remove the axial and radial free play that is inherent in angular contact ball bearings, and to establish an initial level of stiffness by raising the contact area between the balls 115 and the inner and outer races.

One of the problems with such prior art bearings is that their cost increases very rapidly as the size of the bearing decreases. A bearing having a 6 mm outer diameter currently costs between about $4 to $5 each. Smaller bearings are even more expensive because they are manually assembled. Furthermore, two such bearings are necessary in order have the preload of one bearing counter the preload of the other. Furthermore, the axial preload which is typically applied is approximately 400 gm. Such large preloads are required to account for the differences in the diameter of the balls 115. However, a 400 gm preload tends to deform the balls and races and is partially responsible for a hysteretic behavior in the actuator, which in turn, limits the smallest possible arc over which the actuator can be moved (i.e., minimum actuator stroke). It will be clear to those skilled in the art that the length of the smallest possible actuator stroke must be less than the data track pitch (i.e., the distance between data tracks stored on the medium). Currently, prior art actuators have difficulty accurately positioning a read/write head over one track of a medium on which 6000 tracks per inch are stored. Furthermore, the mass of the bearings adds to overall actuator inertia, which directly increases the actuator move time.

Accordingly, it is an object of the present invention to provide a pivot actuator which has a low mass and inertia. Another object of the present invention is to provide a pivot actuator that is inexpensive to manufacture. Still another object of the present invention is to provide a pivot that can be used with very high density direct access storage devices which have very large numbers of tracks per inch. Yet another object of the present invention is to reduce the hysteretic loss of the pivot during actuator seek.

SUMMARY OF THE INVENTION

The present invention is a radially and axially preloaded bearing that has a very low mass, a profile or height that approaches the diameter of the balls, and that can be used in an actuator pivot of a direct access storage device without the need for a second bearing to counter the preload. There are several possible embodiments of the invention. In accordance with one embodiment of the present invention, the outer race is split on a vertical plane (i.e., axially split), and three balls are inserted between the inner and outer races. The inner race preferably has a notch through which balls may be inserted. The required preload is provided by correctly sizing the outer race, so that when the balls are inserted there is a radial force pushing the balls into the inner race. Since there are only three balls, contact is ensured between all the balls and the inner and outer races. The inner and outer races are shaped so that there are four points of contact with each ball (two with the inner race and two with the outer race).

A limiter maintains each of the three balls within one of three operating arcs between the inner and outer race, each operating arc being of a predetermined length. The limiter is essentially a flat ring having protrusions which protrude into the gap between the inner and outer races in order to limit the motion of the balls to an operating arc which is equal in length to the distance between the protrusions. Alternatively, a conventional ball cage is used to limit the operating arc of the balls. In accordance with one embodiment of the present invention, a seal is provided to retain a lubricant and/or prevent contaminants from entering the gap between the inner and outer races.

In accordance with an alternative embodiment of the present invention, the outer race is a closed toroid. The inner race is split at the mid-plane of the inner race to form a lower and an upper race, each being a closed toroid. Three balls are preferably disposed between the outer race and each of the inner races. In an alternative embodiment, additional balls may be provided. Each of the balls make contact with the outer race at two contact points. In addition, the balls make contact with the lower inner race at one contact point and with the upper inner race at one contact point. The bearing is assembled by first placing the lower inner race on a central shaft fixed to the base casting of the direct access storage device. The outer race is then installed over the central shaft. The balls are then installed between the lower inner and the outer race. The upper inner race is then pressed down over the balls to cause each ball to contact the outer race at two contact points, the lower inner race at one contact point, and the upper inner race at one contact point. A predetermined preload force is then exerted on the upper inner race. The upper inner race is then fixed in position, such as by epoxy adhesive. A limiter, similar to the limiter described above, is used to limit the movement of each of the balls. Alternatively, a conventional ball cage is used in place of the limiter to maintain an even spacing between the balls.

In yet another alternative embodiment of the present invention, the outer race is split at the mid-plane of the outer race into an upper outer race and a lower outer race. The inner race is a single closed toroid. Accordingly, the bearing is assembled by installing the balls between the inner race and the lower outer race, and then preloading the outer upper race by applying a compressive force between the upper and lower outer race. The upper and lower outer race is then fixed in place. A limiter, similar to the limiter described above, is used to limit the movement of each of the balls. Alternatively, a conventional ball cage is used.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 2A:
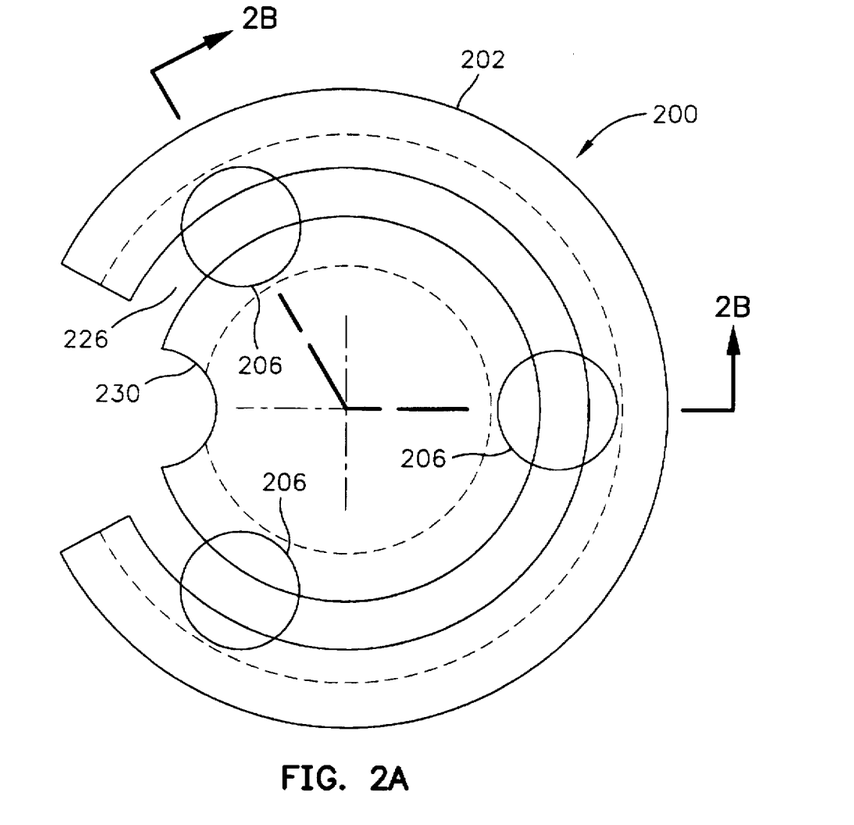
FIG. 2a is an illustration of a pivot in accordance with one embodiment of the present invention for allowing rotary motion of a load beam in a direct access storage device.
Figure 2B:
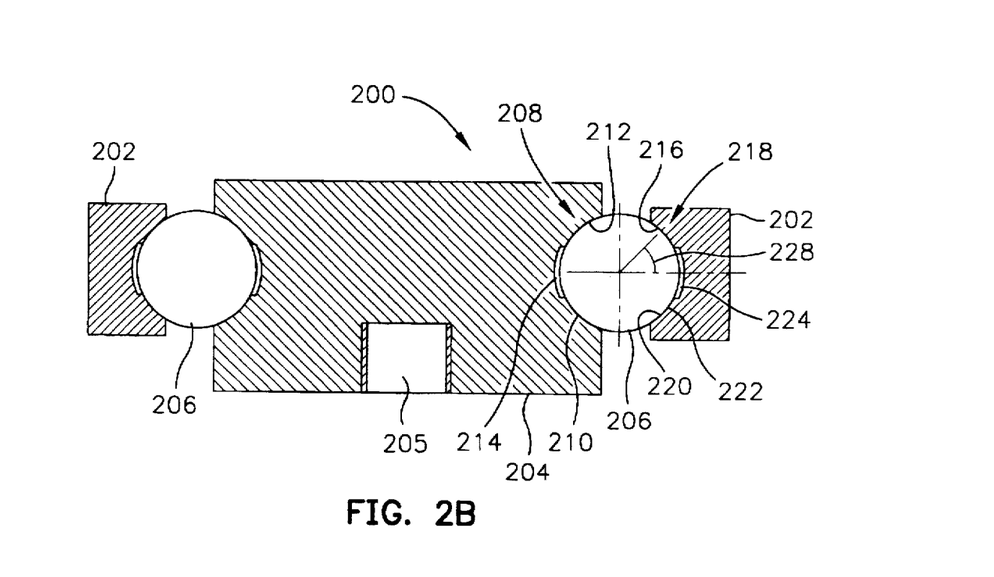
FIG. 2b is a cross-sectional view of the pivot of FIG. 2a taken along line A—A.

FIG. 2a is an illustration of a pivot 200 in accordance with the one embodiment of the present invention for allowing rotary motion of an actuator in a direct access storage device. FIG. 2b is a cross-sectional view of the pivot of FIG. 2a taken along line A—A. The pivot 200 includes an axially split outer race 202, an inner race 204, and preferably three balls 206. The inner race 204 preferably has a recess 205 sized to conform to a shaft (not shown) which protrudes from the base casting of the direct access storage device. The inner race 204 is fixed to the shaft and remains rigid with respect to the stationary components of the direct access storage device. The outer rim of the inner race 204 is contoured to allow a ball 206 to make contact with the inner race 204 at two "contact" points 208, 210. Each of the two contact points are preferably separated by 90° around the circumference of each ball 206.

A line defined by the contact point and the center of the ball 206 on which the contact point lies forms a "contact angle" 228 with the radial plane which is coincident with the centers of each of the balls 206 when the balls are all in place. The first contact point 208 is preferably at a contact angle of 45° above the radial plane. The second contact point is preferably at a contact angle of 45° below the radial plane. In an alternative embodiment, the contact angle of each contact point may be selected to provide different ratios of radial and axial stiffness. That is, at contact angles of 45°, the radial and axial stiffness are essentially equal, as is the radial and axial preload forces. However, at an angle of 90° from the radial plane, there will be no radial stiffness (i.e., the inner race 204 and the outer race 202 will be free to move radially toward one another). If, on the other hand, the contact angle is 0° (i.e., the contact points lie on the plane that is coincident with the centers of the three balls 206), then the inner and outer races 204, 202 will be free to slide axially past one another.

In accordance with one embodiment, the surface 212 of the inner race 204 on which the first contact point 208 lies is generally concave, with a radius of curvature that is slightly greater than the radius of the balls 206. Each other such surface will be similarly contoured. (Preferably, all of the balls 206 are the same size. However, due to tolerances of manufacture, slight variations in the size of each ball will exist). Alternatively, the surface 212 may be either flat, convex, or may have a complex shape, so long as only one point on the surface 212 can contact each ball. However, generally flat and convex contours will exert greater stress on the contact points. The surface on which the first contact point lies is separated from the surface on which the second contact point 210 lies by a recess 214. The recess 214 ensures that each ball 206 contacts the inner race 204 at only two points.

The split outer race 202 is preferably fabricated from a resilient material, such as steel. The inner dimensions of the split outer race 202 are such that the race must expand radially to allow the balls 206 to be accommodated between the inner and outer races 204, 202 in order to cause a preload to be generated. The amount of expansion required in order to accommodate the balls 206 and the type of material that is used will determine the exact preload. The preload on each of the balls 206 is equal due to the fact that three equally spaced balls are used. In the preferred embodiment of the present invention, the preload on each ball 206 remains constant as the outer race rotates with respect to the inner race due to the fact that the cross section of each race is preferably constant along its circumference.

Each ball 206 makes contact with the outer race 202 at two contact points. The inner surface of the outer race 202 is contoured similarly to the outer surface of the inner race 204. That is, a first surface 216 on which the first contact point 218 lies is generally concave, with a radius of curvature that is slightly greater than the radius of the balls 206. A second surface 220 on which a second contact point 222 lies is also similarly contoured. The second surface 220 is separated from the first surface by a recess 224 which ensures that each ball 206 contacts the outer race 202 at only two points. It will be clear to those skilled in the art that the particular shape of the surfaces 216, 220 may vary significantly. For example, one or both of the surfaces 216, 220 may be convex, flat or irregular in shape. Furthermore, in an alternative embodiment of the present invention, the recess 224 is not provided.

In accordance with one embodiment of the present invention, a steel ball 206 of 0.6 mm radius is used with an axial track radius of 0.65 mm, (i.e., a radius of curvature of 0.65 mm in surface 208, 210, 218 and 220), an outer race having a diameter of 6 mm, and a contact radius of 2.8 mm in the radial direction at contact points 218 and 222. The compressive contact stress is about 36 ksi. The preload is approximately 10 gm. In accordance with this embodiment, the compressive contact stress is about 20% of yield stress. Under these conditions, the outer race 202 will start to yield when the load increases by a factor of approximately 130. Accordingly, stresses generated during shock can be handled without damage to the pivot. In addition, the total mass of the moving parts within the actuator is preferably about 0.08 gm, thus adding to the ability of the present invention to withstand large shock loads.

A portion of the inner race 204 is preferably cut-away. The cut-away section 230 allows each of the balls 206 to pass into and out of the gap 226 between the inner and outer races 204, 202 for assembly and replacement of the balls 206.

Figure 3A:
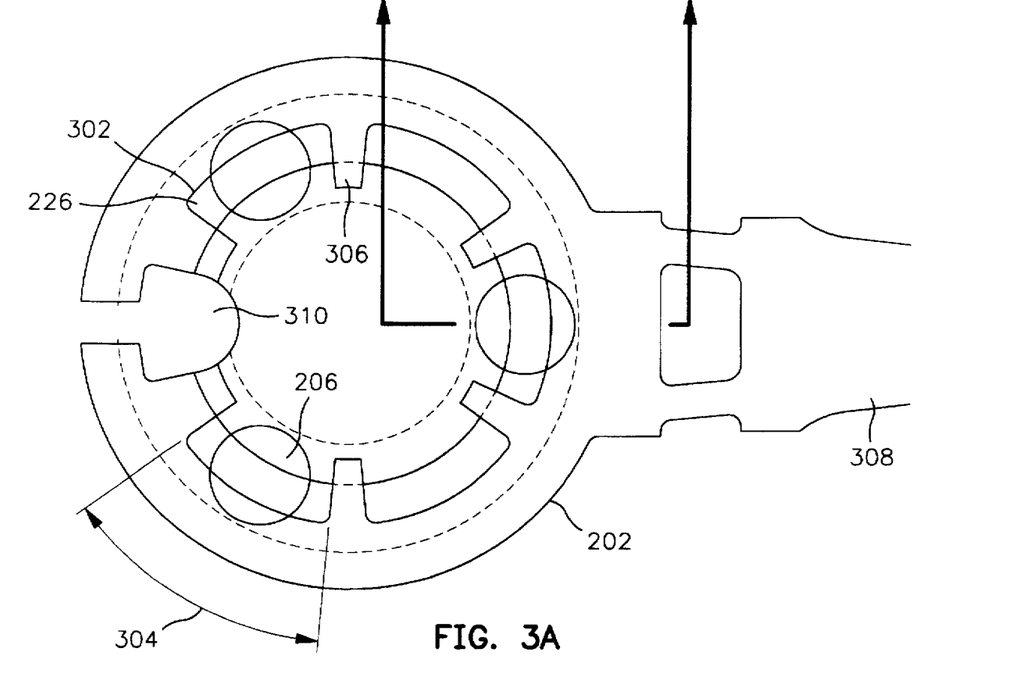
FIG. 3a illustrates an embodiment of the present invention in which a limiter is provided.
Figure 3B:
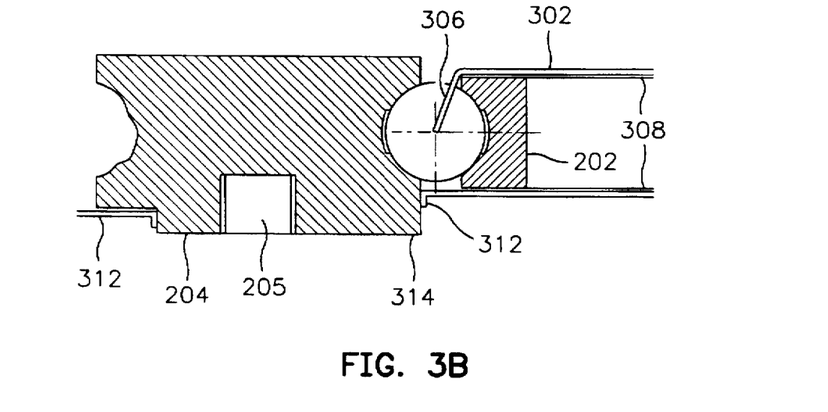
FIG. 3b is a cross-sectional view of the pivot of FIG. 3a taken along line B—B.

FIG. 3a illustrates an embodiment of the present invention in which a limiter 302 is provided to restrain the motion of the balls 206 to a limited arc 304 with respect to the outer race 202. FIG. 3b is a cross-sectional view of the pivot of FIG. 3a taken along line B—B. The limiter 302 is essentially a flat ring having six protrusions 306 which protrude into the gap 226 between the inner and outer races 204, 202 in order to limit the motion of the balls to an operating arc 304 which is equal in length to the distance between the protrusions 306. The limiter 302 ensures that the balls remain essentially equally spaced within the gap 226. The operating arc 304 is preferably one half the length of the maximum total pivot arc during normal operation. To ensure that the balls roll during normal operation, each of the balls 206 must be positioned at the center of the operating arc 304 when the pivot is at the center of the total pivot arc. If the balls 206 are out of alignment either initially or due to a shock incurred during operation, the balls are forced back into alignment as the pivot moves through its full range of motion in both directions. That is, if one or more of the balls 206 become out of alignment, the misaligned balls 206 will be forced to skid to the center of the operating arc 304 during a seek motion to either the inner or outer most portion of the medium, depending upon whether the ball is misaligned to the left or right. Once the balls 206 are aligned, they each roll as the outer race 202 rotates about the inner race 204.

In FIGS. 3a and 3b, the limiter is illustrated as being fixed to the outer race 202. If fixed to the outer race 202, then the limiter 302 preferably has an opening 310 which allows the balls 206 to pass through the limiter 302 into the gap 226. In an alternative embodiment of the present invention, the limiter 302 is fixed to the inner race 204. As shown in FIG. 3a and 3b, a load beam 308 is also fixed to the outer race 202. In yet another alternative embodiment, the balls 206 are retained within the operating arc by a conventional ball cage (not shown) which resides within the gap 226.

FIG. 3b further illustrates a sealing mechanism 312 which seals the bottom of the bearing to retain a lubricant and/or prevent contaminants from entering the gap 226 from below The sealing mechanism shown in FIG. 3b includes a cover plate which fits within a recess 314 in the inner race 204. Such a seal is not provided in the preferred embodiment, since a lubricant is considered to be unnecessary and it is not likely that contaminants will be present in the environment of a direct access storage device. However, in yet another embodiment of the present invention, an even more secure seal is provided in which the entire bearing is shrouded in a flexible polymer jacket to prevent contaminants from entering the bearing.

Figure 4A:
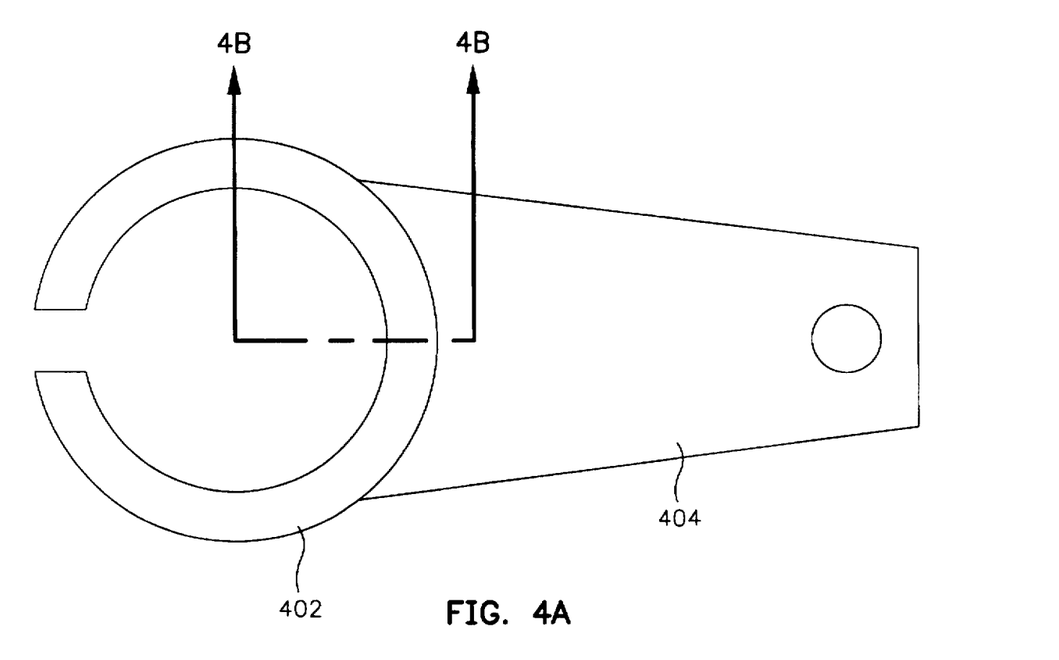
FIGS. 4a and 4b illustrate another embodiment of the present invention in which the outer race is fabricated as part of the actuator arm.
Figure 4B:
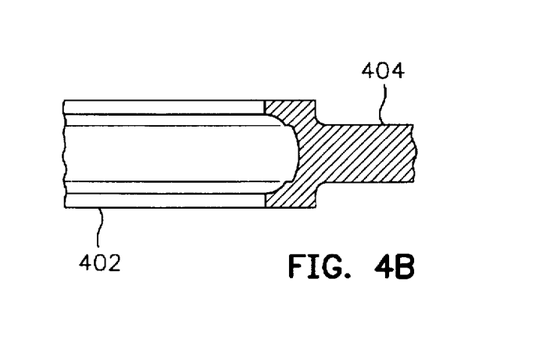

FIGS. 4a and 4b illustrate another embodiment of the present invention in which the outer race 402 is fabricated as part of an actuator arm 404. Each of the features described above with regard to the bearing shown in FIGS. 2a, 2b, 3a, and 3b are essential identical in the embodiment shown in FIGS. 4a and 4b.

Figure 5A:
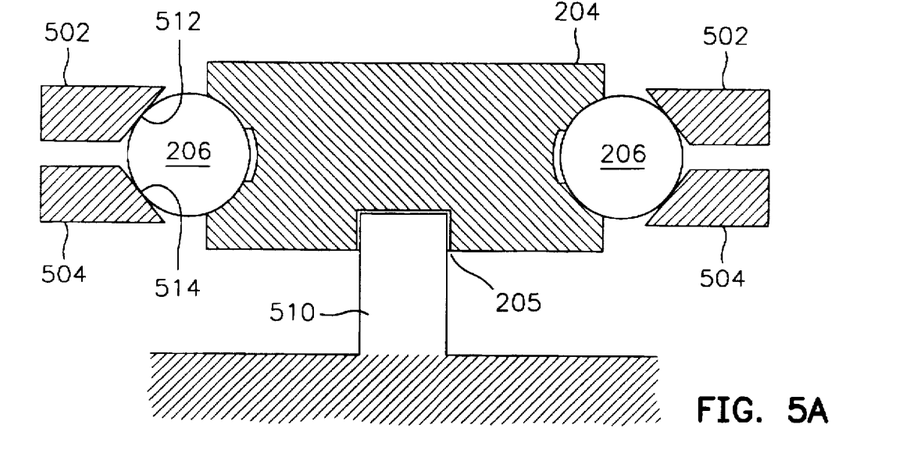
FIGS. 5a and 5b illustrate yet another alternative embodiment of the present invention in which the outer race is split into two closed toroids to form an upper outer race and a lower outer race.
Figure 5B:
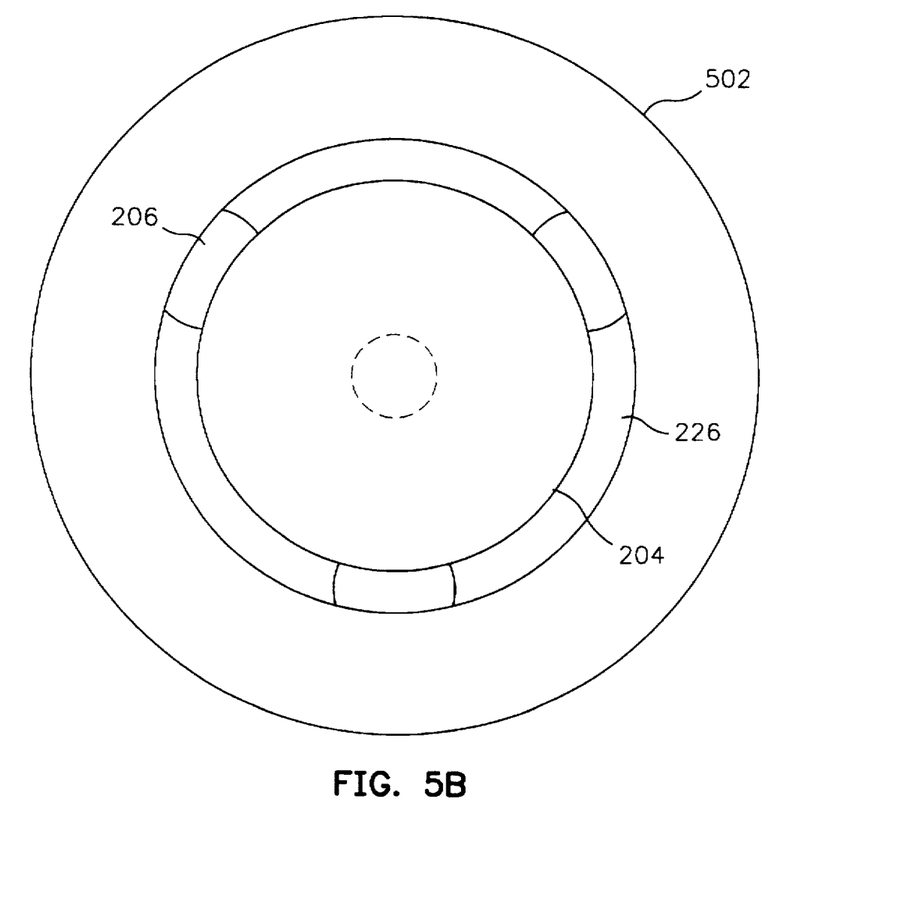

FIGS. 5a and 5b illustrate yet another alternative embodiment of the present invention. In accordance with the embodiment illustrated in FIGS. 5a and 5b, the outer race is split into two closed toroids to form an upper outer race 502 and a lower outer race 504. The inner race 204 is essentially identical to the inner race 204 shown in FIGS. 2a, 2b, 3a, and 3b. The contact surfaces 506, 508 (i.e., the surfaces on which the contact point lie) of the outer race are contoured such that the balls 206 make contact with each outer race 502, 504 at only one point. Since the outer races are closed toroids, an evenly applied compressive force applied downward on the upper outer race 502 and upward on the lower outer race 504 will urge the balls 206 into contact with each of the four contact points (i.e., two on the inner race, one on the upper outer race 502, and one on the lower outer race 504). In accordance with one embodiment of the present invention, the upper and lower outer races 502, 504 are fixed in position (such as by use of an adhesive, screws, or any other means for maintaining the position of each of the races after release of the compressive force) while such a compressive force is applied in order to maintain a preload on the bearing. In accordance with one embodiment of the present invention, the outer races 502, 504 are fixed to an actuator body (not shown). Such a bearing is assembled by mounting the inner race 204 to a shaft 510, which is fixed to the casting of the direct access storage device. Then the upper outer race 502 is fixed to an actuator body (not shown) which suspends the race 502 generally in position with respect to the inner race 204. The balls 206 are then installed such that each ball contacts the contact surface 512 of the upper outer race 502. The lower outer race 504 is then placed in contact with each of the balls 206. A compressive force is applied downward on the upper outer race 502 and upward on the lower outer race 504 to bring the balls into a proper position in which each ball makes contact with each of the four contact surfaces (two contact surfaces 212, 210 of the inner race 204, one contact surface 510 of the upper outer race 502, and one contact surface 514 of the lower outer race 504). The lower outer race 502 is then fixed in position to maintain the preload after the compressive force on the races 502, 504 is released. Alternatively, the lower outer race can be fixed in position prior to applying the compressive force to the outer races 502, 504. In yet another alternative embodiment, one or both outer race 502, 504 remain relatively free to move axially and a preload is applied by a spring which urges one or both races 502, 504 toward the other race 504, 502.

Figure 6A:
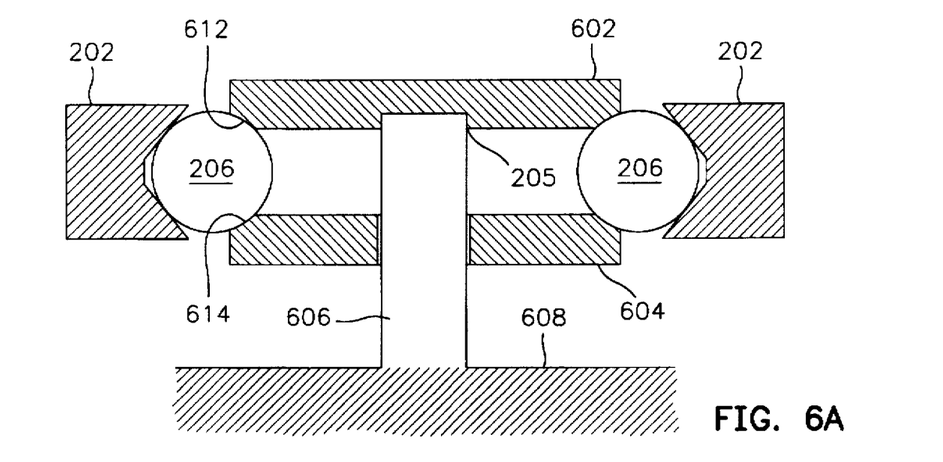
FIGS. 6a and 6b illustrate an alterative embodiment of the present invention in which the inner race is split into an upper inner race 602 and lower inner race 604.
Figure 6B:
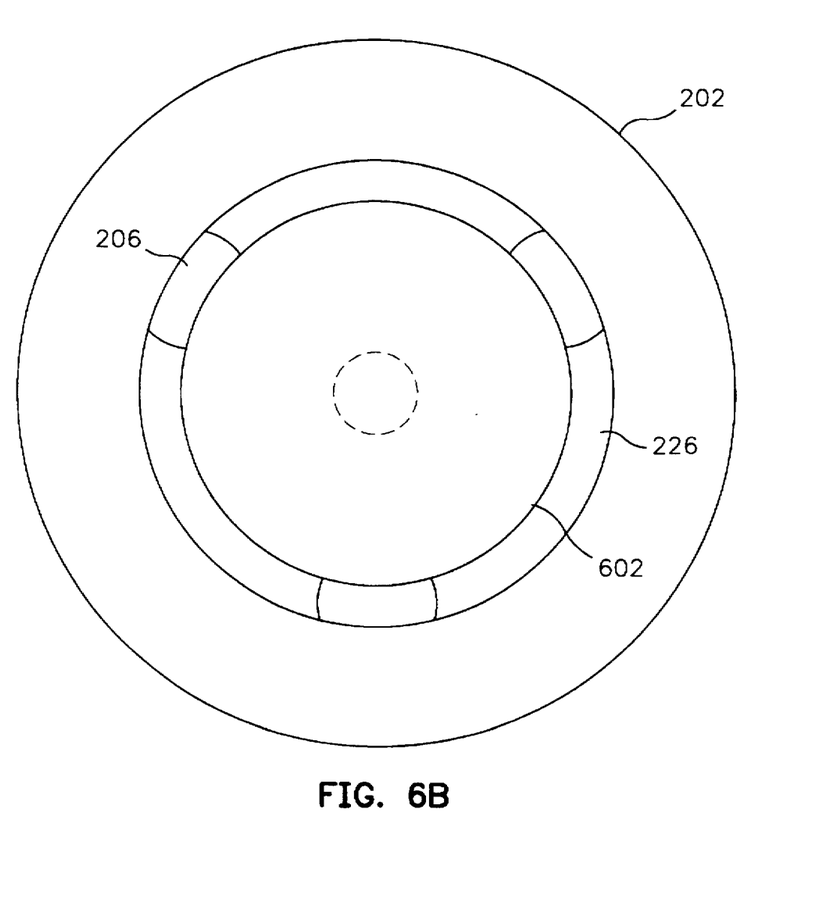

In yet another alternative embodiment of the present invention shown in FIGS. 6a and 6b, the inner race is split into an upper inner race 602 and lower inner race 604. The lower inner race 604 is a closed toroid. The center of the lower inner race 604 has in inner diameter that is approximately equal to the outer diameter of a shaft 606 which is fixed to a base casting 608 of the direct access storage device. The upper inner race 602 has a recess 610 into which the shaft 606 is inserted to fix the upper inner race 602 to the direct access storage device. Alternatively, the upper inner race 602 is a closed toroid through which the shaft 606 passes. That is, instead of a recess, the upper inner race 602 has a through hold through which the shaft passes. The upper inner race 602 can then be bonded, screwed, or otherwise fixed to the shaft 606. In this embodiment, assembly is performed by mounting the outer race 202 to an actuator body and fixing the upper inner race 602 to a shaft 606. The balls are then installed such that each ball makes contact with a contact surface 612 of the upper inner race 602. The lower inner race 604 is then positioned such that each of the balls are in contact with a contact surface 614 of the lower inner race 604. The lower inner race 604 is then preloaded and fixed in place, such as by applying an adhesive between the lower inner race 604 and the shaft 606. Alternatively, any means for fixing the lower inner race 604 to the shaft 606 may be used, such as screws, chemical bonding, brazing, welding, or other such means. Alternatively, the lower inner race 604 is fixed to the shaft and the upper inner race 602 is allowed to remain relatively free until after application of the preload. In yet another alternative embodiment, one or both inner race 602, 604 remain relatively free to move axially and a preload is applied by a spring which urges to one or both races 602, 604 toward the other race 604, 602.

In yet another embodiment, a first inner race can be bonded to the shaft 606 and a second inner race preloaded and bonded to the shaft 606.

The contact surfaces 612, 614 of the inner races 602, 604 are contoured so that the balls 206 make contact at a single contact point. For example, the contact surfaces are concave with a radius of curvature that is greater than the radius of the balls 206. Alternatively, the contact surfaces 612, 614 are either flat, convex, or a complex shape which ensures that only one point is tangent to an arc having a radius of curvature equal to the radius of the balls 206. By compressing the inner races 602, 604 (i.e., applying upward pressure on the lower inner race 604 and downward pressure on the upper inner race 602, each of the balls 206 will come into contact with each of the four contact points (i.e., two on the outer race 202, one on the upper inner race 602, and one on the lower inner race 604).

Each pivot made in accordance with the present invention requires only one bearing, which preferably has three balls. The fact that the pivots have only one bearing reduces both the cost and the mass of the pivot. Accordingly, the pivots of the present invention are faster, as well as cheaper. Furthermore, the use of three balls ensures that each of the balls will make contact with each of the four contact points with minimal preloading. Thus, the preload pressure used in the present invention is preferably relatively low. Use of a lower preload pressure means that the distortion to the balls and races is minimized, and the friction between the balls and each race is reduced. Still further, aside from the cost savings realized as a result of the simplification from two to one bearing, the cost of manufacturing the present inventive pivot is less than in prior art pivots. For example, since the embodiment shown in FIGS. 2a and 2b automatically preloads the bearing due to the resilience of the outer race 202. In the case of the invention shown in FIGS. 5a and 5b, the preload can be implemented by allowing the outer races 502, 504 to move relatively freely while applying a compressive force. The preload can then be maintained by fixing the outer races 502, 504 with respect to one another. In the case of the invention shown in FIGS. 6a and 6b, one of the inner races 602, 604 can be fixed, and a pressure applied to the other inner race 604, 602 to implement the preload. The other inner race can then be fixed to the shaft 606 in order to maintain the preload.

It should be understood that in each embodiment of the present invention, each of the races may be fixed to a fixture using any of a number of techniques, including gluing with an adhesive, screwing, chemical bonding, brazing, or any other technique which results in the race being held in place relative to at least one other component of either the bearing, the pivot, or the direct access storage device.

Figure 7:
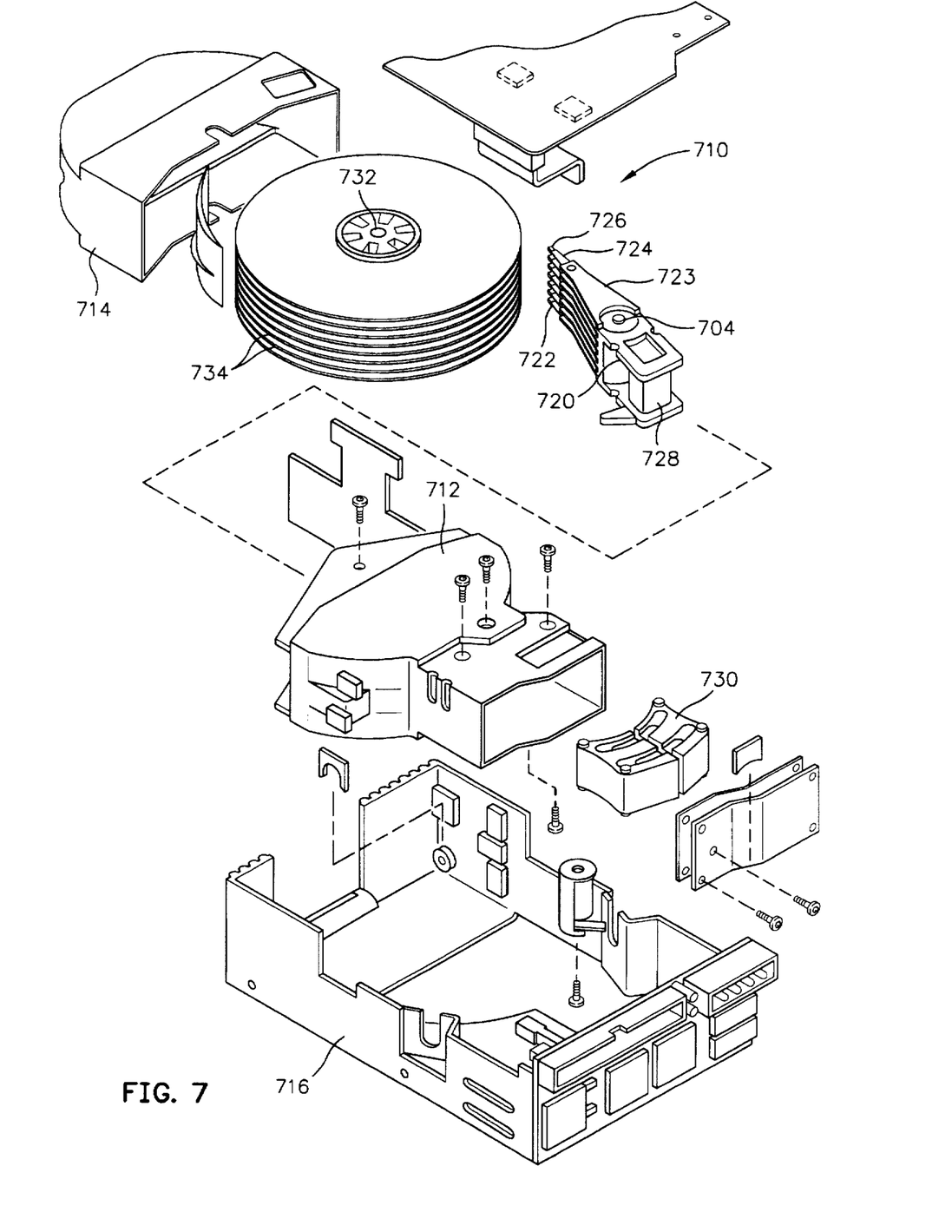
FIG. 7 is an exploded view of a disk drive.

This invention is useful with all disk drive mechanical configurations and all Direct Access Storage Devices (DASDs). FIG. 7 is an exploded view of a disk drive 710. Disk drive 710 includes a housing 712 and a housing cover 714, which is mounted within a frame 716 after assembly. Rotatably attached within housing 712 on an actuator shaft 704 is an actuator arm assembly 720. Actuator arm assembly 720 includes an E-block or comb-like structure 722 having a plurality of arms 723. Attached to separate arms 723 on the comb or E-block 722, are load springs 724. Attached at the end of each load spring 724 is a slider 726 that carries a magnetic transducer (not shown). On the end of the actuator arm assembly 720 opposite load springs 724 and slider 726 is a voice coil 728.

Attached within housing 712 is a pair of magnets 730. Magnets 730 and voice coil 728 are key parts of a voice coil motor that applies a force to actuator assembly 720, thereby rotating it about the actuator bearing 200 and an actuator shaft 204. Also mounted within housing 712 is a spindle shaft 732. Rotatably attached to spindle shaft 732 are a number of disks 734. The disks 734 are attached to the spindle shaft 732 in a spaced-apart relationship.

While the particular direct access storage device actuator bearings as herein shown and described in detail are fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A ball bearing for use in an actuator of a direct access storage device, including:
   (a) a plurality of balls;
   (b) an inner race having an upper contact surface and a lower contact surface, each contact surface of the inner race contoured such that each ball can simultaneously contact only one point on each contact surface of the inner race; and
   (c) an axially split outer race having an upper contact surface and a lower contact surface, each contact surface of the outer race contoured such that each ball can simultaneously contact only one point on each contact surface of the outer race, the undeformed diameter of the outer race being such that a preload will be exerted upon each of the plurality of balls when installed between the inner race and the outer race to ensure that each ball contacts each of the four contact surfaces.

2. The bearing of claim 1, further including a recess between the upper and lower contact surface of the inner race.

3. The bearing of claim 1, further including a recess between the upper and lower contact surface of the outer race.

4. The bearing of claim 1, wherein the upper and lower contact surface of the inner race has a radius of curvature that is at least equal to the radius of the largest of the plurality of balls.

5. The bearing of claim 1, wherein the upper and lower contact surface of the outer race has a radius of curvature that is at least equal to the radius of the largest of the plurality of balls.

6. The bearing of claim 1, wherein the inner race has a notch through which the balls may be inserted.

7. The bearing of claim 1, wherein the outer race is coupled to an actuator arm at a side of the outer race opposite the split.

8. The bearing of claim 7, wherein the actuator arm and the outer race are integrally formed.

9. The bearing of claim 1, wherein the outer race is coupled to a load beam at a side of the outer race opposite the split.

10. The bearing of claim 9, wherein the load beam and the outer race are integrally formed.

11. The bearing of claim 1, further including a seal for at least partially enclosing the balls within a gap between the inner and outer race.

12. The bearing of claim 1, wherein each ball contacts the inner surface of the outer race at contact angles of approximately 45°.

13. The bearing of claim 1, wherein each ball contacts the outer surface of the inner race at contact angles of approximately 45°.

14. The bearing of claim 1, further including a limiter.

15. The bearing of claim 14, wherein the limiter is a generally flat ring structure having a plurality of protrusions, each protrusion extending into a gap between the inner race and the outer race to restrict the movement of the balls along an arc within the gap.

16. An actuator pivot ball bearing for use in a direct access storage device, including:
  (a) three balls;
  (b) an inner race having an upper contact surface, a lower contact surface, each contact surface of the inner race contoured such that each ball can simultaneously contact only one point on each contact surface of the inner race; and
  (c) an axially split toroidal outer race having an upper contact surface, and a lower contact surface, each contact surface of the outer race contoured such that each ball can simultaneously contact only one point on each contact surface of the outer race, the undeformed diameter of the outer race being such that a preload will be exerted upon each of the three of balls when installed between the inner race and the outer race to ensure that each ball contacts each contact surface at only one point.

17. A ball bearing for use in an actuator of a direct access storage device, including:
  (a) a plurality of balls;
  (b) an inner race having an upper contact surface and a lower contact surface, such that each ball can simultaneously contact only one point on each contact surface of the inner race; and
  (c) a radially split outer race including:
    (1) an upper outer race having a contact surface contoured to allow only one contact point between the upper outer race and each ball; and
    (2) a lower outer race having a contact surface contoured to allow only one contact point between the lower outer race and each ball.

18. The bearing of claim 17, further including a recess between the upper and lower contact surface of the inner race.

19. The bearing of claim 17, wherein the upper and lower contact surface of the inner race has a radius of curvature that is greater than the radius of the largest of the plurality of balls.

20. A ball bearing for use in an actuator of a direct access storage device, including:
  (a) a plurality of balls;
  (b) an outer race having an upper contact surface and a lower contact surface, such that each ball can simultaneously contact only one point on each contact surface of the outer race; and
  (c) a radially split inner race including:
    (1) an upper inner race having a contact surface contoured to allow only one contact point between the upper inner race and each ball; and
    (2) a lower inner race having a contact surface contoured to allow only one contact point between the inner race and each ball.

21. The bearing of claim 20, further including a recess between the upper and lower contact surface of the outer race.

22. The bearing of claim 20, wherein the upper and lower contact surface of the outer race has a radius of curvature that is greater than the radius of the largest of the plurality of balls.

23. A direct access storage device having a housing, a housing cover, a frame, a spindle shaft, at least one disk, and an actuator arm assembly, including:
  (a) at least one actuator arm and;
  (b) a ball bearing assembly, including:
    (1) a plurality of balls;
    (2) an inner race having an upper contact surface and a lower contact surface, each contact surface of the inner race contoured such that each ball can simultaneously contact only one point on each contact surface of the inner race; and
    (3) an axially split outer race having an upper contact surface and a lower contact surface, each contact surface of the outer race contoured such that each ball can simultaneously contact only one point on each contact surface of the outer race, the undeformed diameter of the outer race being such that a preload will be exerted upon each of the plurality of balls when installed between the inner race and the outer race to ensure that each ball contacts each of the four contact surfaces.

24. A direct access storage device having a housing, a housing cover, a frame, a spindle shaft, at least one disk, and an actuator arm assembly, including:
  (a) at least one actuator arm and;
  (b) a ball bearing assembly, including:
    (1) a plurality of balls;
    (2) an inner race having an upper contact surface and a lower contact surface, such that each ball can simultaneously contact only one point on each contact surface of the inner race; and (3) a radially split outer race including:
  (i) an upper outer race having a contact surface contoured to allow only one contact point between the upper outer race and each ball; and
  (ii) a lower outer race having a contact surface contoured to allow only one contact point between the lower outer race and each ball.

25. A direct access storage device having a housing, a housing cover, a frame, a spindle shaft, at least one disk, and an actuator arm assembly, including:
  (a) at least one actuator arm and;
  (b) a ball bearing assembly, including:
    (1) a plurality of balls;
    (2) an outer race having an upper contact surface and a lower contact surface, such that each ball can simultaneously contact only one point on each contact surface of the outer race; and
    (3) a radially split inner race including:
      (i) an upper inner race having a contact surface contoured to allow only one contact point between the upper inner race and each ball; and
      (ii) a lower inner race having a contact surface contoured to allow only one contact point between the inner race and each ball.

26. A direct access storage device having a housing, a housing cover, a frame, a spindle shaft, at least one disk, and an actuator arm assembly, including:
  (a) at least one actuator arm and;
  (b) an actuator pivot ball bearing for use in a direct access storage device, including:
    (1) three balls;
    (2) an inner race having an upper contact surface, a lower contact surface, each contact surface of the inner race contoured such that each ball can simultaneously contact only one point on each contact surface of the inner race; and
    (3) an axially split toroidal outer race having an upper contact surface, and a lower contact surface, each contact surface of the outer race contoured such that each ball can simultaneously contact only one point on each contact surface of the outer race, the undeformed diameter of the outer race being such that a preload will be exerted upon each of the three of balls when installed between the inner race and the outer race to ensure that each ball contacts each contact surface at only one point.

* * * * *

UNITED STATES PATENT AND TRADEMARK OFFICE
CERTIFICATE OF CORRECTION

PATENT NO.   :   5,768,060
DATED        :   June 16, 1998
INVENTOR(S)  :   Albrecht et al It is certified that error appears in the above-indentified patent and that said Letters Patent is hereby corrected as shown below:

Title page, item [54] and Col. 1, line 1, change "POFILE" to
--PROFILE--

Signed and Sealed this

Twenty-second Day of September, 1998

Attest:

BRUCE LEHMAN

Attesting Officer        Commissioner of Patents and Trademarks